(12) United States Patent
Shang et al.

(10) Patent No.: US 11,287,976 B2
(45) Date of Patent: Mar. 29, 2022

(54) METHOD, ELECTRONIC DEVICE AND COMPUTER READABLE STORAGE MEDIUM FOR STORAGE MANAGEMENT

(71) Applicant: EMC IP Holding Company LLC, Hopkinton, MA (US)

(72) Inventors: Rongrong Shang, Beijing (CN); Ruiyong Jia, Beijing (CN); Shuai Ni, Beijing (CN); Sihang Xia, Beijing (CN); Zhenhua Zhao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 4 days.

(21) Appl. No.: 16/821,410

(22) Filed: Mar. 17, 2020

(65) Prior Publication Data
US 2020/0341637 A1 Oct. 29, 2020

(30) Foreign Application Priority Data
Apr. 24, 2019 (CN) .......................... 201910335443.9

(51) Int. Cl.
*G06F 3/00* (2006.01)
*G06F 3/06* (2006.01)
(52) U.S. Cl.
CPC .......... *G06F 3/0604* (2013.01); *G06F 3/0631* (2013.01); *G06F 3/0689* (2013.01)

(58) Field of Classification Search
CPC ..... G06F 3/0604; G06F 3/0631; G06F 3/0689
See application file for complete search history.

(56) References Cited

U.S. PATENT DOCUMENTS

| | | | |
|---|---|---|---|
| 7,409,522 B1* | 8/2008 | Fair ......................... | G06F 3/061 |
| | | | 711/170 |
| 9,823,968 B1* | 11/2017 | Fugini ................. | G06F 11/1076 |
| 9,934,069 B2 | 4/2018 | Polkovnikov et al. | |
| 10,592,111 B1 | 3/2020 | Wang et al. | |
| 10,860,496 B2 | 12/2020 | Li et al. | |
| 2008/0114931 A1* | 5/2008 | Aoki ................... | G06F 11/3447 |
| | | | 711/114 |

* cited by examiner

*Primary Examiner* — Craig S Goldschmidt
(74) *Attorney, Agent, or Firm* — BainwoodHuang (57) ABSTRACT

Techniques involve: in response to adding a second set of disks into a redundant array of independent disks (RAID) including a first set of disks and a total number of disks in the first and second sets exceeding a predetermined threshold, determining types and numbers of disks in the first and second sets, respectively; determining, based on the types and numbers of the disks determined and a performance indicator of the RAID having the added second set, respective types and numbers of disks comprised in a plurality of sets to which the disks in the RAID are to be allocated; and performing, based on the type and number of disks in the first set and the respective types and numbers of disks, an allocation of a disk in the first set to one of the plurality of sets, until all the disks in the first set have been allocated.

17 Claims, 8 Drawing Sheets

METHOD, ELECTRONIC DEVICE AND COMPUTER READABLE STORAGE MEDIUM FOR STORAGE MANAGEMENT

CROSS REFERENCE TO RELATED APPLICATION

This application claims priority to Chinese Patent Application No. CN201910335443.9, on file at the China National Intellectual Property Administration (CNIPA), having a filing date of Apr. 24, 2019, and having "METHOD, ELECTRONIC DEVICE AND COMPUTER READABLE STORAGE MEDIUM FOR STORAGE MANAGEMENT" as a title, the contents and teachings of which are herein incorporated by reference in their entirety.

FIELD

Embodiments of the present disclosure generally relate to the field of computer, and more specifically, to a method, electronic device and computer readable storage medium for storage management.

BACKGROUND

As known, a redundant array of independent disks (RAID) may combine a plurality of disks as a disk array. By providing redundant disks, a storage system based on an RAID may cause reliability of the entire disk array far better than that of a single disk. In order to meet users' demands on data reliability and response time of the storage system, a mapped redundant array of independent disks (mapped RAID) has been developed so far. The mapped RAID includes one or more RAID stripes. The RAID stripe is a logical concept and may include a plurality of extents. The plurality of extents included in one stripe may be distributed over different physical disks (which are also referred to as disk below).

In order to attain high reliability of the storage system, it is required to restrict the number of disks involved in rebuilding the storage system. In the situation, when the number of disks in the RAID exceeds a predetermined threshold, the disks in the RAID may be divided into groups, and the plurality of extents in one stripe may be allocated to disks in the same group. How to perform the division has become a hot issue.

SUMMARY

Embodiments of the present disclosure provide an improved solution for storage management.

According to a first aspect of embodiments of the present disclosure, there is provided a method of storage management. The method includes: in response to adding a second set of disks into a redundant array of independent disks including a first set of disks and a total number of disks in the first and second sets of disks exceeding a predetermined threshold, determining types and numbers of disks in the first and second sets of disks, respectively; determining, based on the types and numbers of the disks determined and a performance indicator of the redundant array of independent disks having the added second set of disks, respective types and numbers of disks comprised in a plurality of sets to which the disks in the redundant array of independent disks having the added second set of disks are to be allocated; and performing, based on the types and numbers of disks in the first set of disks and the respective types and numbers of disks comprised in the plurality of sets, an allocation of a disk in the first set of disks to one of the plurality of sets, until all the disks in the first set of disks have been allocated.

According to a second aspect of embodiments of the present disclosure, there provides an electronic device. The device includes: at least one processor; and a memory coupled to the at least one processor and having instructions stored thereon, the instructions, when executed by the at least one processor, causing the device to execute acts including: in response to adding a second set of disks into a redundant array of independent disks including a first set of disks and a total number of disks in the first and second sets of disks exceeding a predetermined threshold, determining types and numbers of disks in the first and second sets of disks, respectively; determining, based on the types and numbers of the disks determined and a performance indicator of the redundant array of independent disks having the added second set of disks, respective types and numbers of disks comprised in a plurality of sets to which the disks in the redundant array of independent disks having the added second set of disks are to be allocated; and performing, based on the types and numbers of disks in the first set of disks and the respective types and numbers of disks comprised in the plurality of sets, an allocation of a disk in the first set of disks to one of the plurality of sets, until all the disks in the first set of disks have been allocated.

According to a third aspect of the present disclosure, there provides a computer readable storage medium. The computer readable storage medium has computer readable program instructions stored thereon, and the computer readable program instructions cause, when executed by a processing unit, the processing unit to perform the method according to the first aspect of the present disclosure.

BRIEF DESCRIPTION OF THE DRAWINGS

Through the following detailed description with reference to the accompanying drawings, the above and other objectives, features, and aspects of various implementations of the present disclosure will become more apparent. Several implementations of the present disclosure will be illustrated by way of example but not limitation. In the drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred implementations of the present disclosure will now be described in more detail with reference to the drawings. Although the preferred implementations of the present disclosure are illustrated in the drawings, it would be appreciated that the present disclosure may be implemented in various manners but cannot be limited by the implementations as described herein. Rather, these implementations are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an implementation" are to be read as "at least one example implementation." The term "another implementation" is to be read as "at least one other implementation." The terms "first," "second," and the like may refer to different or same objects. Other definitions, explicit and implicit, may be included below.

Figure 1:
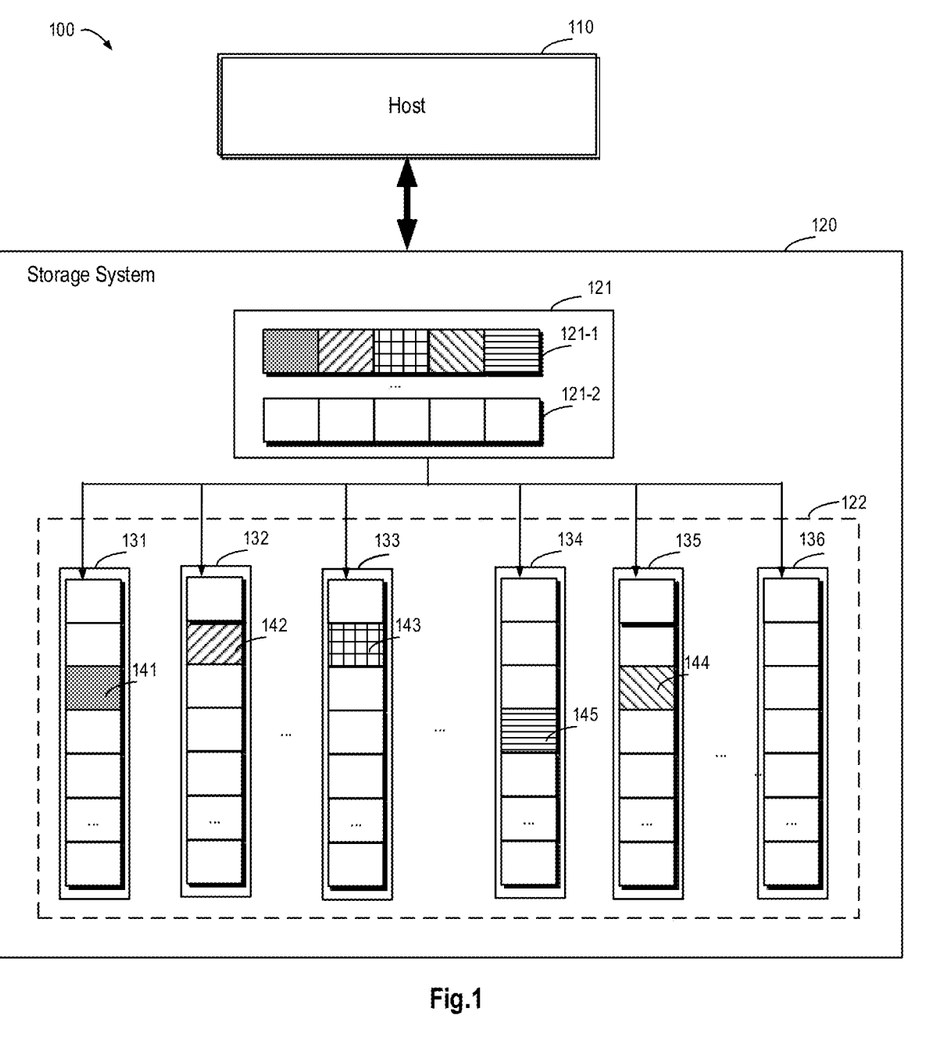
FIG. 1 is a block diagram illustrating an example environment in which embodiments of the present disclosure may be implemented.

FIG. 1 is a schematic diagram 100 illustrating an example environment in which embodiments of the present disclosure may be implemented. As shown in FIG. 1, a host 110 may transmit a data input/output (I/O) request to a storage system 120. For example, the host 110 may transmit, in response to a command (not shown) from a user or application, a data I/O request to the storage system 120, to implement data write or read.

In embodiments of the present disclosure, the host 110 may be any entity or device that can access the storage system 120. For example, the host 110 may be any terminal device, server device, server cluster, or the like. In embodiments of the present disclosure, the storage system 120 may be any storage system based on an RAID or mapped RAID (which is also referred to as RAID, for convenience). There are lots of criteria for RAIDs, such as RAID-1, RAID-2, RAID-3, RAID-4, RAID-5, RAID-6, RAID-10, RAID-50, and the like.

The storage system 120 may determine, from the received I/O data request, one or more of stripes 121-1 and 121-2 (for example, the stripe 121-1) in the RAID stripe 121 corresponding to data. Then, slices in physical disks (which are represented collectively by 122) corresponding to extents of a stripe, such as slices 141, 142, 143, 144 and 145 corresponding to extents of the stripe 121-1, are determined so as to write data to or read data from the slices. It would be appreciated that the RAID stripes, the number of extents, the number of disks and the number of RRSs as shown are provided only as an example, which are not limited to the example as shown in the figure, and may be more or less than those shown in FIG. 1.

As discussed above, in order to achieve high reliability of a storage system, it is required to restrict a number of disks involved in rebuilding of the storage system, which means that disk slices need to be allocated in a limited number of disks. When a new disk is added to the RAID 120 or the RAID 120 is initialized, the number of disks in the RAID 120 may exceed a predetermined threshold (for example, 25). In order to ensure data reliability of the RAID 120, the disks in the RAID 120 may be divided into groups which may be referred to as RAID Resiliency Sets (RRSs), or may be referred to as disk sets herein, for convenience.

Figure 2:
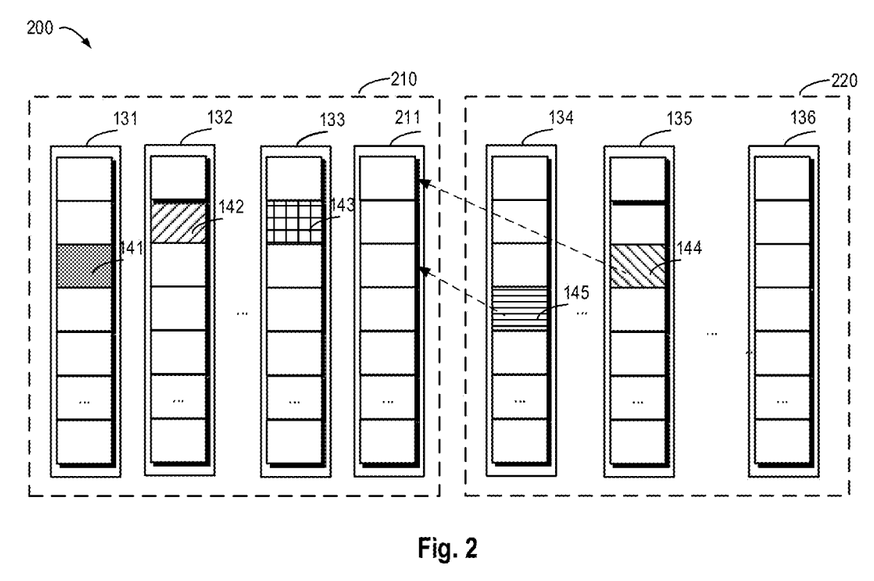
FIG. 2 is a schematic diagram illustrating data movement in the example environment.

In embodiments of the present disclosure, it is required that disk slices corresponding to extents in each stripe come from the same RRS. However, for example, when new disks are added, the group division may cause these disk slices to be distributed to different RRSs, and thus movement of data is needed to move the data on these data slices to the same RRS. FIG. 2 is a schematic diagram 200 illustrating movement of data in an example environment. As shown in FIG. 2, for example, a disk 211 and other disks which are not shown are added to the RAID 120 in FIG. 1. Assumed that the number of disks in the RAID 120 exceeds 25, the disks 131, 132, 133, 134, 135, 136, 210 and the like in the RAID 120 are divided into RRSs 210 and 220. As shown in FIG. 2, the disks 131, 132 and 133, in which the disk slices 141, 142 and 143 corresponding to some extents in the stripe 121-1 are located, are allocated to the RRS 210, and the disks 135 and 134, in which the disk slices 144 and 145 corresponding to some extents of the stripe 121-1 are located, are allocated to the RRS 220. In this case, it is required to move, for example, the data on the disk slices 144 and 145 to the RRS 210 (for example, to idle slices on the disk 211).

Figure 3:
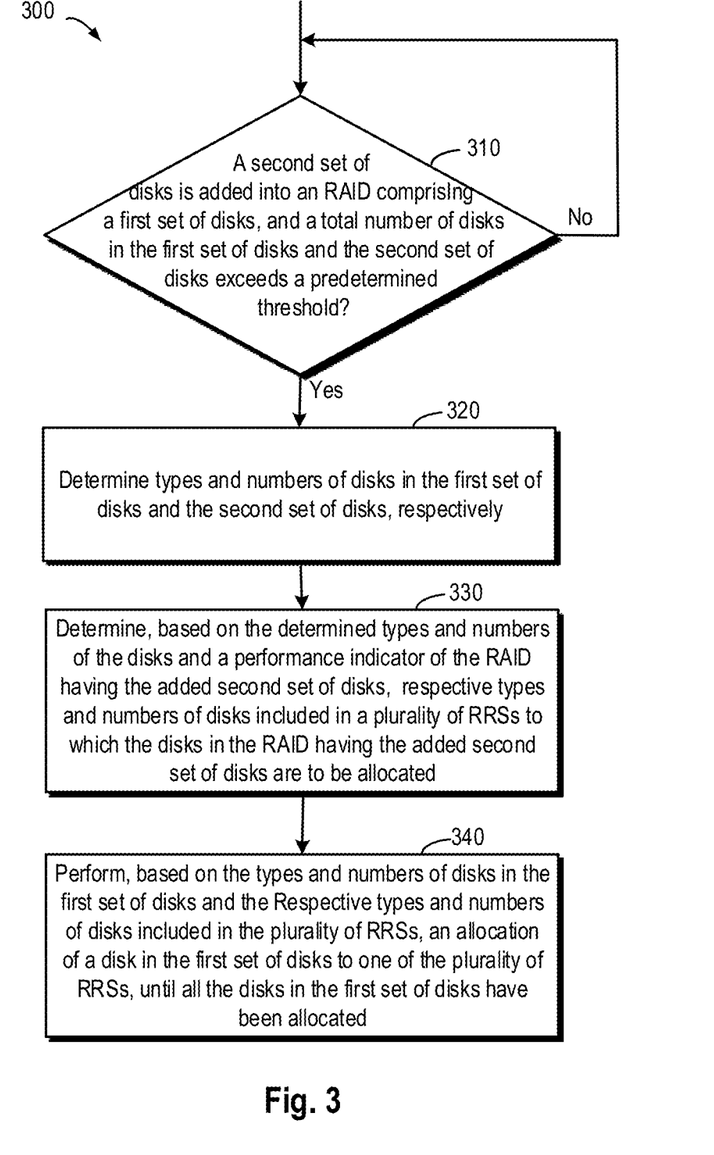
FIG. 3 is a schematic diagram illustrating a method for storage management according to embodiments of the present disclosure.

According to various embodiments of the present disclosure, there is provided an improved disk allocation solution for allocating disks in an original disk set as many as possible to the same RRS, thereby reducing movement of data among different RRSs. According to embodiments of the present disclosure, the types and numbers of disks in a plurality of RRSs into which the RAID is to be divided are determined firstly based on a desired performance indicator of the RAID, and an allocation or mapping of disks in the original disk set to the plurality of RRSs is then performed based on a similarity between the original disk set and the plurality of RRSs in terms of type and number of disks, so as to reduce movement of data among different RRSs. Detailed description will be given below with reference to FIG. 3. FIG. 3 is a flowchart of a method 300 for storage management according to embodiments of the present disclosure. The method 300 may be implemented at the storage system 120 as shown in FIG. 1.

As shown in FIG. 3, at block 310, it is determined whether a second set of disks (newly added disks, such as the disk 211) is added into an RAID (for example, the RAID 120), including a first set of disks (original disks, such as a set 122) and a total number of disks in the first and second sets of disks exceeds a predetermined threshold. According to embodiments of the present disclosure, the predetermined threshold may be set empirically. In alternative embodiments, the predetermined threshold may be determined through a reliable model. For example, the predetermined threshold may be 25. However, the present disclosure is not limited to this, and any other appropriate number may be set in any other appropriate manner.

If it is determined at block 310 that the total number of disks does not exceed the predetermined threshold, disks are directly added to the first set of disks, without performing the disk allocation operation. If it is determined at block 310 that the total number of disks exceeds the predetermined threshold, the method proceeds to block 320. At block 320, the types and the numbers of disks in the first and second sets of disks are determined respectively. According to embodiments of the present disclosure, a number of disks of each type in the first and second sets of disks may be determined.

At block 330, based on the types and numbers of disks determined at block 320 and the performance indicator of the RAID, the respective types and numbers of disks included in a plurality of sets (RRSs) to which disks in the RAID are to be allocated are determined. According to embodiments of the present disclosure, the performance indicator of the RAID may include at least one of the following: a configuration of the RAID, effective capacities of respective disks in the first and second sets of disks, the maximum effective capacity among respective disks in the first and second sets of disks.

According to embodiments of the present disclosure, an effective capacity refers to a capacity in a disk that can be provided for disk slices for a stripe. Disks of the same type have the same physical capacities. If there are no enough disks of the same type to satisfy the RAID width requirement, the effective capacities of disks may be less than the physical capacities of the disks. According to embodiments of the present disclosure, in an RRS, in order to ensure a sufficient idle space for data storage, a specific number of slices may be reserved. This can guarantee that, when one disk in the RRS fails and the data in the RRS need to be rebuilt in the idle space, the RAID stripe in the RRS can still continue providing the I/O service, and can still protect the stored data using an RAID redundant mechanism. In some embodiments, the size of the reserved space may be equal to the maximum effective capacity among disks in the RRS.

In some embodiments, types and numbers of disks included in a plurality of RRSs to be divided may be determined so as to maximize a sum of effective capacities of disks in the RAID, i.e., to maximize the overall effective capacity of the RAID. According to embodiments of the present disclosure, based on the types and numbers of the disks included respectively in the first and second sets of disks, the number of RRSs and the types and numbers of disks in each RRS may be determined by collectively considering the effective capacities of the disks in the RAID, the size of the reserved space and the configuration of the RAID, thereby maximizing the overall effective capacity of the RAID. For example, by perform permutations for respective RRS division solutions, a solution capable of maximizing the overall effective capacity of the RAID may be selected. It would be appreciated that the RRS division manner capable of maximizing an overall effective capacity of an RAID may be determined in any other appropriate manner existing in the art or to be developed in the future. As such, movement of data is reduced while the overall effective capacity of the RAID is maximized.

In alternative embodiments, respective types and numbers of disks included in a plurality of RRSs to be divided may also be determined so as to accomplish other desired performances of an RAID, such as a relatively larger overall effective capacity greater than a predetermined value, and the like, thereby increasing the overall effective capacity. It would be appreciated that the present disclosure does not limit the RRS division manner in any way, which is omitted herein.

At block 340, based on the types and numbers of disks in the first set of disks determined at block 320 and the respective types and numbers of disks included in the plurality of RRSs determined at block 330, an allocation of a disk in the first set of disks to one of the plurality of RRSs is performed until all the disks in the first set of disks have been allocated. In this way, by allocating first the disks in the first set of disks, the disks in the first set of disks may be allocated as many as possible to a same RRS, thereby reducing movement of data.

According to some embodiments of the present disclosure, based on a similarity between the first set of disks and each RRS in the plurality of RRSs in terms of type and number of disks, an allocation of a disk in the first set of disks to the plurality of RRSs may be performed so as to reduce movement of data and thus lower an impact on the performance of the I/O service.

In some embodiments, an allocation of disks in the first set of disks may be performed so as to minimize movement of data on the disks in the first set of disks. In consideration with the RRS division manner maximizing the overall effective capacity of the RAID, movement of data is minimized while maximizing the overall effective capacity of the RAID, and thus an impact on the performance of the I/O service is minimized.

Figure 4:
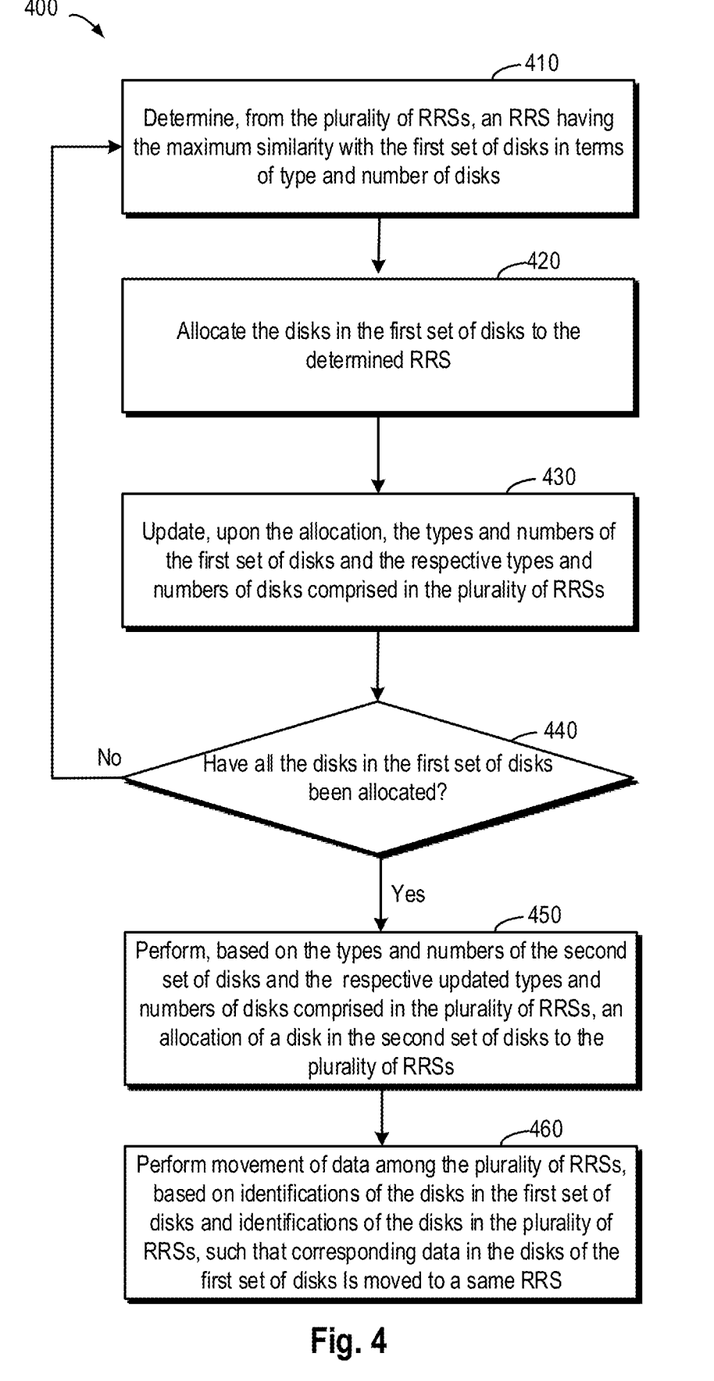
FIG. 4 is a flowchart illustrating a method of storage management according to another embodiment of the present disclosure.

The process of how to allocate or map, upon determination of the types and numbers of disks in each RRS, disks for the RRS so as to minimize the movement of data will be detailed below with reference to FIG. 4. FIG. 4 is a flowchart illustrating a method 400 of storage management according to another embodiment of the present disclosure. FIG. 4 may be implemented at, for example, the storage system 120 as shown in FIG. 1.

As shown in FIG. 4, at block 410, a set having the maximum similarity with a first set of disks (for example, the set 122 in FIG. 1) in terms of type and number of disks is determined from a plurality of RRSs (for example, RRSs 210 and 220 in FIG. 2).

According to embodiments of the present disclosure, a first matrix may be generated based on the types and numbers of disks in the first set of disks, which is expressed by the equation (1) below:

$$R_{M,1} = \begin{Bmatrix} c_1 \\ c_2 \\ c_3 \\ \vdots \\ c_{M-2} \\ c_{M-1} \\ c_M \end{Bmatrix} \quad (1)$$

where $R_{M,1}$ represents the first matrix, $M$ represents a number of all disk types in the first and second sets of disks, and $C_i$ ($i=1, \ldots, M$) represents a number of disks in the first set of disks corresponding to each of all the disk types in the first and second sets of disks. For a newly added disk type $i$, $C_i$ is actually zero in the first matrix.

According to embodiments of the present disclosure, a second matrix may be generated based on the respective types and numbers of disks included in the plurality of RRS, which is expressed by the equation (2) below:

$$A_{M,N} = \begin{Bmatrix} a_{1,1} & a_{1,2} & & a_{1,N-1} & a_{1,N} \\ a_{2,1} & a_{2,2} & \ldots & a_{2,N-1} & a_{2,N} \\ a_{3,1} & a_{3,2} & & a_{3,N-1} & a_{3,N} \\ & & \vdots & & \\ a_{M-2,1} & a_{M-2,2} & & a_{M-2,N-1} & a_{M-2,N} \\ a_{M-2,1} & a_{M-1,2} & \ldots & a_{M-1,N-1} & a_{M-1,N} \\ a_{M,1} & a_{M,2} & & a_{M,N-1} & a_{M,N} \end{Bmatrix} \quad (2)$$

where $A_{M,N}$ represents the second matrix, M represents a number of all disk types in the first and second sets of disks, N represents a number of RRSs, $a_{i,j}$ (i=1, . . . , M, and j=1, . . . , N) represents a number of disks in the $j^{th}$ RRS corresponding to a disk type i in the first and second sets of disks.

According to embodiments of the present disclosure, a third matrix may be obtained from a product of a transposed matrix of the first matrix $R_{M,1}$ and the second matrix $A_{M,N}$, which is expressed by the equation (3) below:

$$B_{1,N} = R_{M,1}{}^T \times A_{M,N} = \{b_1 b_2 b_3 \ldots b_N\} \quad (3)$$

where $B_{1,N}$ represents the third matrix, M represents a number of all disk types in the first and second sets of disks, N represents a number of RRSs, and $b_i$ (i=1, . . . , N) represents a priority that the $i^{th}$ RRS obtains disks from the first set of disks. As $b_i$ becomes greater, the priority grows higher.

According to embodiments of the present disclosure, RRS i corresponding to the greatest $b_i$ in the third matrix $B_{1,N}$ is determined as a RRS to which the disks in the first set of disks will be firstly allocated. Then, at block 420, disks in the first set of disks may be allocated to the determined RRS i. At block 430, upon the allocation, the types and numbers of disks in the first set of disks and the types and numbers of disks in the plurality of RRS are updated.

At block 440, it is determined whether all disks in the first set of disks have been allocated. If it is determined at block 440 that not all disks in the first set of disks have been allocated, blocks 410 to 430 are repeated, based on the updated types and numbers of the first set of disks and the updated types and numbers of the disks in the plurality of RRSs, until it is determined at block 440 that all disks in the first set of disks have been allocated.

If it is determined at block 440 that all disks in the first set of disks have been allocated, the process proceeds to block 450 where an allocation of a disk in the second set of disks is performed. At block 450, disks in the second set of disks may be allocated to the plurality of RRSs based on the types and numbers of disks in the second set of disks and the updated types and numbers of disks in the plurality of RRSs.

Upon completion of the division of RRSs and the reallocation of disks, movement of data may be performed if necessary. For example, at block 460, movement of data may be performed among the plurality of RRSs based on identifications of disks in the first set of disks and identifications of disks in the plurality of RRSs, such that corresponding data in the disks of the first set of disks is moved to a same RRS. According to the solution of FIG. 4, a disk allocation is performed based on the maximum similarity between the original set of disks and the divided RRSs, thereby the least data movement is achieved and an impact on the performance of the I/O service is minimized.

It would be appreciated that, in addition to the method as shown in FIG. 4, the disk allocation solution accomplishing the least data movement may be obtained in any other appropriate manner existing in the art or to be developed in the future. For example, various disk allocation solutions may be obtained by permutations, and a solution which can accomplish the least data movement may be selected therefrom.

The process of a disk allocation has been described above in the case that the second set of disks (new disks) is added into the RAID including the first set of disks (the original disks). It would be appreciated that the solution of the present application may also be applied to a disk allocation in the case that the RAID is initialized. In this case, the number of the disks in the first set of disks may be regarded as zero, and there is no need for data movement.

Moreover, it would be appreciated that the methods in FIGS. 3 and 4 may also be applied to an RAID including a plurality of first sets of disks. In this case, similar operations may be performed for each of the plurality of first set of disks.

Figure 5:
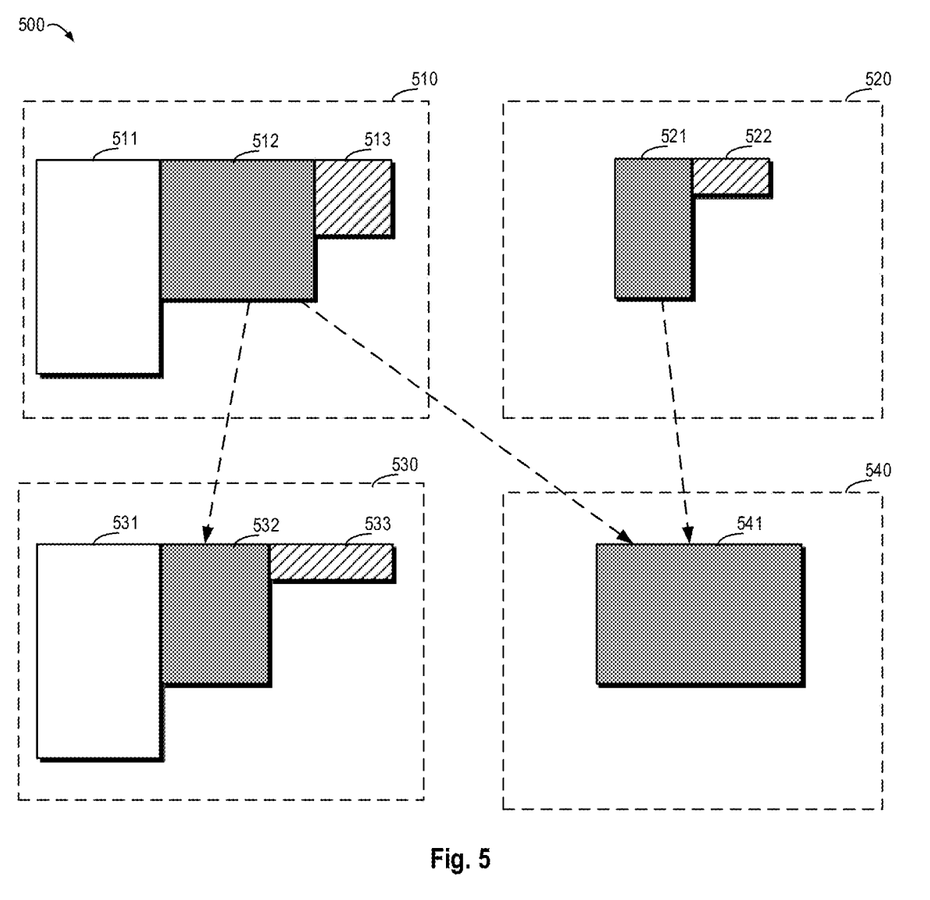
FIG. 5 illustrates an example of a disk allocation according to embodiments of the present disclosure.

For understanding on the above conception of the present disclosure, several examples of disk allocation will be described below with reference to FIGS. 5 to 7. A storage system based on an RAID 5 (4+1) is taken as an example here. FIG. 5 illustrates an example 500 of disk allocation according to embodiments of the present disclosure. In the example 500, it is assumed that the original set of disks 510 includes 12 disks 511 of type 1, 8 disks 512 of type 2, and 3 disks 513 of type 3, and the newly added set of disks 520 includes 3 disks 521 of type 2 and 1 disk 522 of type 3. In the case of maximizing the effective capacity of the RAID, the optimum RRS division manner may be determined as the RRS 530 and RRS 540 as shown in FIG. 5, where the RRS 530 includes 12 disks 531 of type 1, 5 disks 532 of type 2, and 4 disks 533 of type 3, and the RRS 540 includes 6 disks 541 of type 2.

First, for the original set of disks 510, a matrix regarding a respective number of disks of each type is obtained through the equation (1):

$$R_{3,1} = \begin{Bmatrix} 3 \\ 8 \\ 12 \end{Bmatrix}$$

For RRSs 530 and 540, a matrix regarding a respective number of disks of each type therein is obtained through the equation (2):

$$A_{3,2} = \begin{Bmatrix} 4 & 0 \\ 5 & 6 \\ 12 & 0 \end{Bmatrix}$$

Next, a matrix $B_{1,2} = R_{3,1}{}^T \times A_{3,2} = \{196 \ 48\}$ is obtained. Therefore, it is determined to allocate the disks in the original sets of disks 510 firstly to the RRS 530. Here, the disks in the original set of disks 510 are allocated as many as possible to the RRS 530. For example, 12 disks of type 1, 5 disks of type 2, and 3 disks of type 3 are allocated to the RRS 530.

Upon completion of the allocation, the above matrices are updated as follows:

$$R'_{3,1} = \begin{Bmatrix} 0 \\ 3 \\ 0 \end{Bmatrix}$$

-continued $$A'_{3,2} = \begin{Bmatrix} 0 & 0 \\ 0 & 6 \\ 0 & 0 \end{Bmatrix}$$

Subsequently, the updated matrix $B'_{1,2}=R'_{3,1}{}^T \times A'_{3,2}=\{0\ 18\}$ is obtained. Thus, it is determined to allocate the disks in the original set of disks 510 to the RRS 540. For example, 3 disks of type 2 are allocated to the RRS 540. So far, all the disks in the original set of disks 510 have been allocated. Then, the disks in the newly added set of disks 520 are allocated. For example, 3 disks of type 2 are allocated to the RRS 540, and 1 disk of type 3 is allocated to the RRS 530. In this case, it is only required to move the data on the 3 disks of type 2 in the original set of disks 510.

Figure 6:
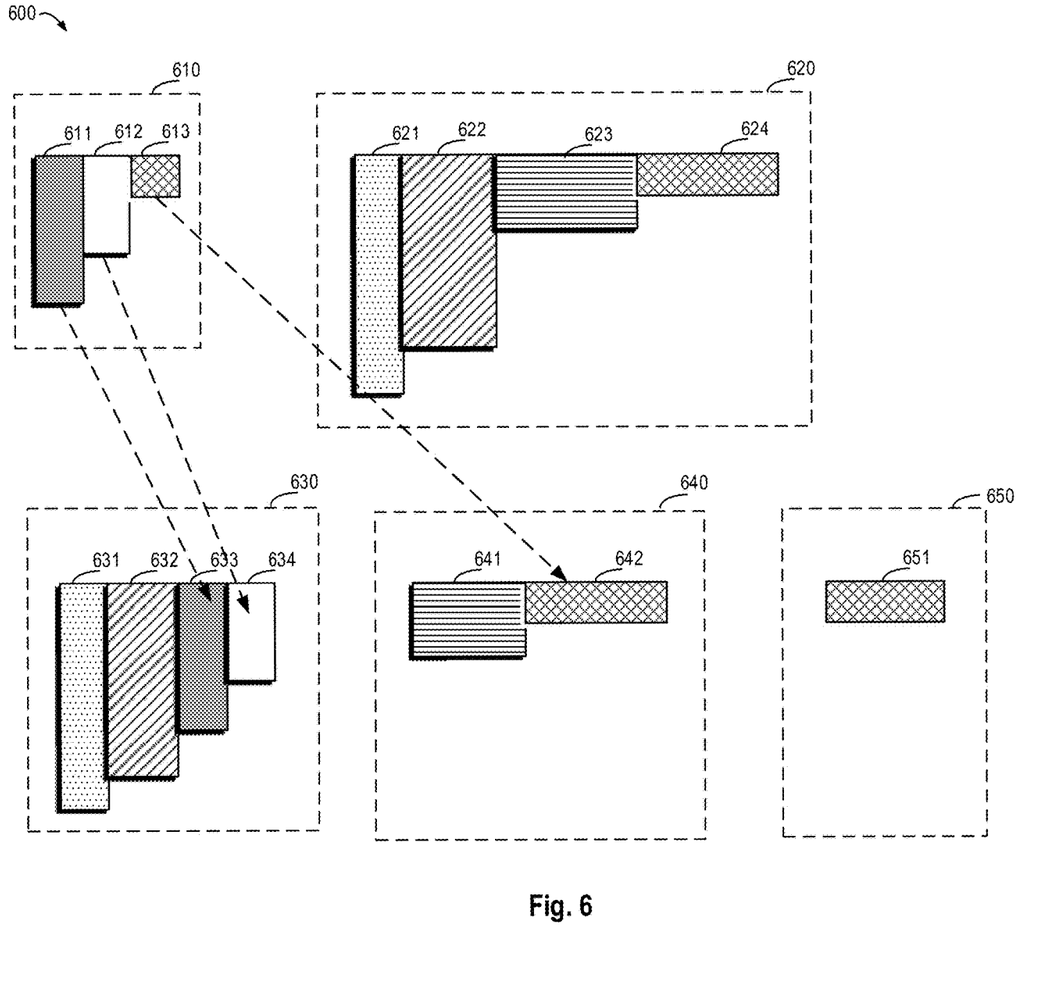
FIG. 6 illustrates another example of a disk allocation according to embodiments of the present disclosure.

FIG. 6 illustrates another example 600 of disk allocation according to embodiments of the present disclosure. In the example 600, it is assumed that the original set of disks 610 includes 4 disks 611 each having a physical capacity of 6G, 6 disks 612 each having a physical capacity of 4G, and 5 disks 613 each having a physical capacity of 800M, and the newly added set of disks 620 includes 5 disks 621 of 10G, 10 disks 622 of 8G, 10 disks 623 of 2G, and 21 disks 624 of 800M. In the case of maximizing the effective capacity of the RAID, it may be determined that the optimum RRS division manner is the RRSs 630, 640 and 650 as shown in FIG. 6, where the RRS 630 includes 5 disks 631 of 10G, 10 disks 632 of 8G, 4 disks 633 of 6G and 6 disks 634 of 4G, the RRS 640 includes 10 disks 641 of 2G and 15 disks 642 of 800M, and the RRS 650 includes 11 disks 651 of 800M.

First, for the original set of disks 610, a matrix regarding a respective number of disks of each type therein may be obtained through the equation (1):

$$R_{6,1} = \begin{Bmatrix} 5 \\ 0 \\ 6 \\ 4 \\ 0 \\ 0 \end{Bmatrix}$$

For the RRSs 630, 640 and 650, a matrix regarding a respective number of disks of each type is obtained through the equation (2):

$$A_{6,3} = \begin{Bmatrix} 0 & 15 & 11 \\ 0 & 10 & 0 \\ 6 & 0 & 0 \\ 4 & 0 & 0 \\ 10 & 0 & 0 \\ 5 & 0 & 0 \end{Bmatrix}$$

Subsequently, a matrix $B'_{6,3}=(R'_{6,1})^T \times A'_{6,3}=\{52\ 0\ 0\}$ is obtained. As a result, it is determined to allocate disks in the original set of disks 610 firstly to the RRS 640. Here, the disks in the original set of disks 610 are allocated as many as possible to the RRS 640. For example, 5 disks of 800M are allocated to the RRS 640.

Upon completion of the allocation, the above matrices are updated as follows:

$$R'_{6,1} = \begin{Bmatrix} 0 \\ 0 \\ 6 \\ 4 \\ 0 \\ 0 \end{Bmatrix}$$

$$A'_{6,3} = \begin{Bmatrix} 0 & 10 & 11 \\ 0 & 10 & 0 \\ 6 & 0 & 0 \\ 4 & 0 & 0 \\ 10 & 0 & 0 \\ 5 & 0 & 0 \end{Bmatrix}$$

Then, the updated matrix $B'_{6,3}=(R'_{6,1})^T \times A'_{6,3}=\{52\ 0\ 0\}$ is obtained. Hence, it is determined to allocate the remaining disks in the original set of disks 610 to the RRS 630. For example, the 4 disks of 6G and 6 disks of 4G are allocated to the RRS 630. At this time, all the disks in the original set of disks 610 have been allocated. Subsequently, the disks in the newly added set of disks 620 are allocated to the RRSs 630, 640 and 650. In this case, it is only required to move the data on the 5 disks of 800M in the original set of disks 610.

Figure 7:
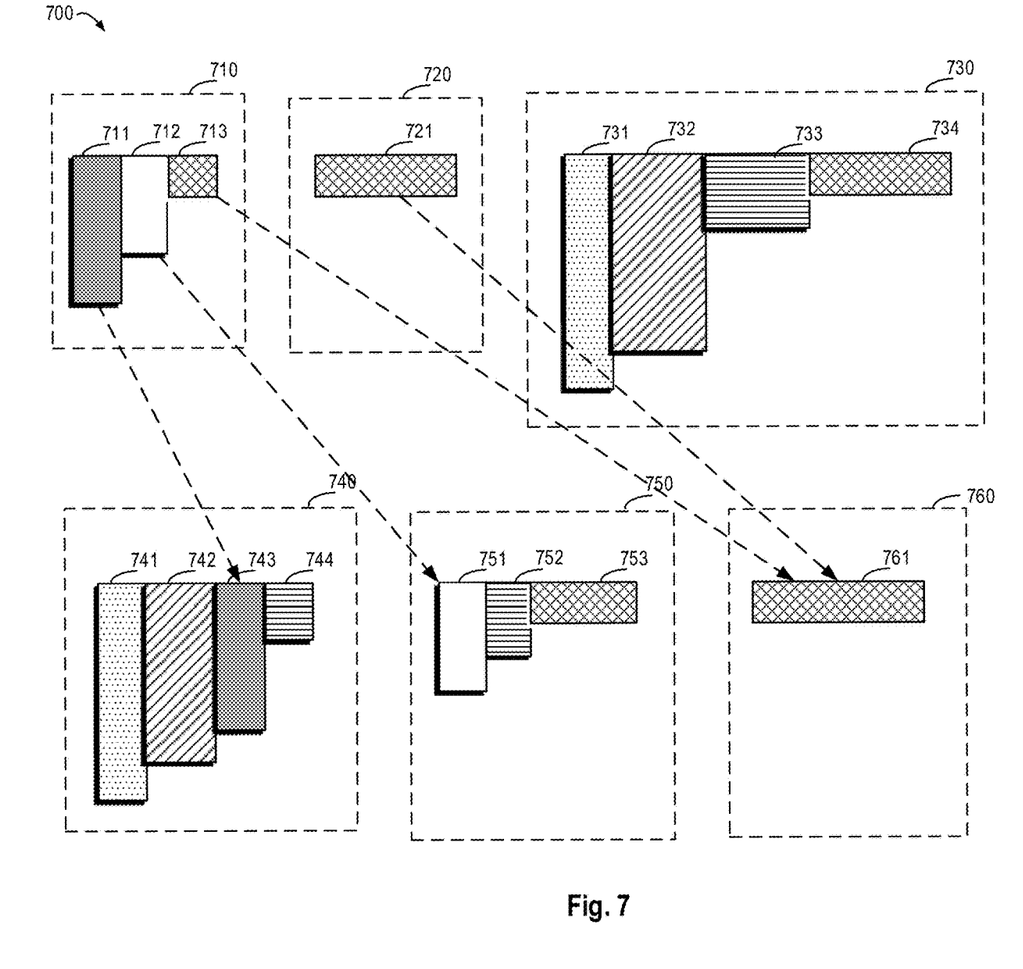
FIG. 7 illustrates a further example of a disk allocation according to embodiments of the present disclosure.

FIG. 7 illustrates a further example 700 of disk allocation according to embodiments of the present disclosure. In the example 700, it is assumed that there are two original sets of disks 710 and 720, wherein the original set of disks 710 includes 6 disks 711 each having a physical capacity of 6G, 6 disks 712 each having a physical capacity of 4G and 6 disks 713 each having a physical capacity of 800M, and the original set of disks 720 includes 15 disks 721 each having a physical capacity of 800M. It is assumed that the newly added set of disks 730 includes 5 disks 731 of 10G, 10 disks 732 of 8G, 10 disks 733 of 2G and 13 disks 734 of 800M. In the case of maximizing the effective capacity of the entire RAID, it may be determined that the optimum RRS division manner is RRSs 740, 750 and 760 as shown in FIG. 7, where the RRS 740 includes 5 disks 741 of 10G, 10 disks 742 of 8G, 6 disks 743 of 6G and 4 disks 744 of 2G, the RRS 750 includes 6 disks 751 of 4G, 6 disks 752 of 2G and 13 disks 753 of 800M, and the RRS 760 includes 21 disks 761 of 800M.

Firstly, for the original set of disks 710, a matrix regarding a respective number of disks of each type is obtained through the equation (1):

$$R_{M,1(RRS0)} = \begin{Bmatrix} 6 \\ 0 \\ 6 \\ 6 \\ 0 \\ 0 \end{Bmatrix}$$

For the RRSs 740, 750 and 760, a matrix regarding a respective number of disks of each type therein is obtained through the equation (2):

$$A_{6,3} = \begin{Bmatrix} 0 & 13 & 21 \\ 4 & 6 & 0 \\ 0 & 6 & 0 \\ 6 & 0 & 0 \\ 10 & 0 & 0 \\ 5 & 0 & 0 \end{Bmatrix}$$

Further, a matrix $B_{6,3} = \{36\ 114\ 126\}$ is obtained. Hence, it is determined to allocate disks in the original set of disks 710 firstly to the RRS 760. Here, the disks in the original set of disks 710 are allocated as many as possible to the RRS 760. For example, 6 disks of 800M are allocated to the RRS 760.

Upon completion of the allocation, the above matrices are updated as follows:

$$R'_{M,1(RRS0)} = \begin{Bmatrix} 0 \\ 0 \\ 6 \\ 6 \\ 0 \\ 0 \end{Bmatrix}$$

$$A'_{6,3} = \begin{Bmatrix} 0 & 13 & 15 \\ 4 & 6 & 0 \\ 0 & 6 & 0 \\ 6 & 0 & 0 \\ 10 & 0 & 0 \\ 5 & 0 & 0 \end{Bmatrix}$$

Further, the updated matrix $B'_{6,3} = (R'_{6,1})^T \times A'_{6,3} = \{36\ 36\ 0\}$ is obtained. Therefore, it is determined to allocate the remaining disks in the original set of disks 740 to the RRSs 740 and 750. For example, 6 disks of 6G are allocated to the RRS 740, and 6 disks of 4G are allocated to the RRS 750. So far, all the disks in the original set of disks 710 have been allocated.

For the original set of disks 720, a matrix corresponding a respective number of disks of each type is obtained through the equation (1):

$$R_{M,1(RRS1)} = \begin{Bmatrix} 15 \\ 0 \\ 0 \\ 0 \\ 0 \\ 0 \end{Bmatrix}$$

For the RRSs 740, 750 and 760, a matrix regarding a respective number of disks of each type is obtained through the equation (2):

$$A_{6,3} = \begin{Bmatrix} 0 & 13 & 15 \\ 4 & 6 & 0 \\ 0 & 0 & 0 \\ 0 & 0 & 0 \\ 10 & 0 & 0 \\ 5 & 0 & 0 \end{Bmatrix}$$

Further, a matrix $B_{6,3} = \{0\ 195\ 225\}$ is obtained. Hence, it is determined to allocate the disk in the original set of disk 720 to the RRS 760. For example, 15 disks of 800M are allocated to the RRS 760.

Subsequently, the disks in the newly added set of disks 730 are allocated to the RRSs 740, 750 and 760. In the case, it is only required to move the data on the 6 disks of 4G and 6 disks of 800M in the original set of disks 740.

In the example 700, although an allocation is performed first for the original set of disks 710, it may also be performed first for the original set of disks 720 in fact. The present application does not make limitation in the aspect.

The method of storage management according to embodiments of the present disclosure has been described. With the method, an allocation is performed first for disks in an original set of disks so that the disks in the original set of disks are allocated as many as possible to the same RRS, thereby reducing the required data movement and further lower an impact on the performance of the I/O service.

Figure 8:
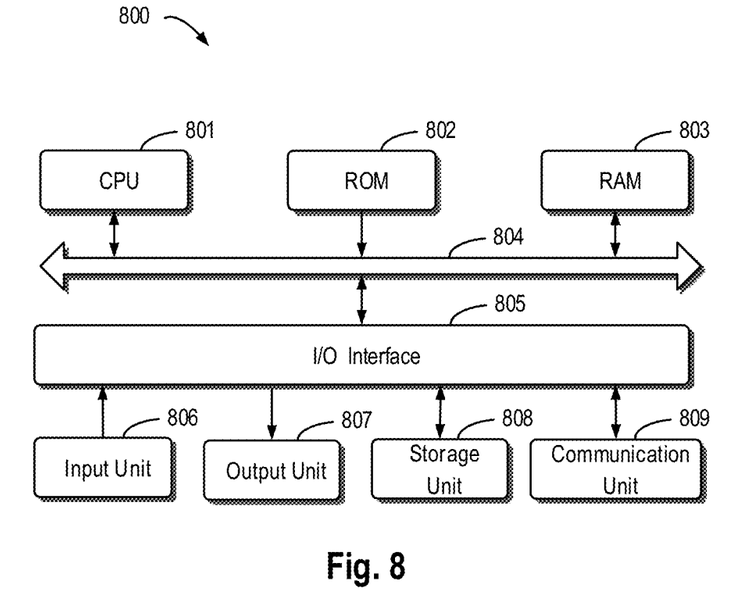
FIG. 8 is a block diagram illustrating an electronic device adapted to implement embodiments of the present disclosure.

FIG. 8 is a block diagram illustrating an example device 800 for storage management according to example implementations of the present disclosure. As shown, the device 800 includes a central processing unit (CPU) 801 which performs various appropriate actions and processing, based on a computer program instruction stored in a read-only memory (ROM) 802 or a computer program instruction loaded from a storage unit 808 to a random access memory (RAM) 803. The RAM 803 stores therein various programs and data required for operations of the device 800. The CPU 801, the ROM 802 and the RAM 803 are connected via a bus 804 with one another. An input/output (I/O) interface 805 is also connected to the bus 804.

The following components in the device 800 are connected to the I/O interface 805: an input unit 806 such as a keyboard, a mouse and the like; an output unit 807 including various kinds of displays and a loudspeaker, etc.; a storage unit 808 including a magnetic disk, an optical disk, and etc.; and a communication unit 809 including a network card, a modem, and a wireless communication transceiver, etc. The communication unit 809 allows the device 800 to exchange information/data with other devices through a computer network such as the Internet and/or various kinds of telecommunications networks.

The method 300 or 400 as described above may be executed by the processing unit 801. For example, in some implementations, the method 300 or 400 may be implemented as computer software programs or computer program products that are tangibly included in a machine readable medium, e.g., the storage unit 808. In some implementations, part or all of the computer programs may be loaded and/or mounted onto the device 800 via ROM 802 and/or communication unit 809. When the computer program is loaded to the RAM 803 and executed by the CPU 801, one or more steps of the method 300 or 400 as described above may be executed. Alternatively, in other embodiments, the CPU 801 may be configured in any other appropriate manners (for example, by means of firmware) to perform the above process/method.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in certain embodiments disclosed herein is not necessarily limited to the specific features or acts described above. Rather, the specific features and acts described above are disclosed as example forms of certain embodiments. In accordance with certain embodiments, movement of data is reduced and an impact on an I/O performance of a storage system is lowered.

We claim:

1. A method of storage management, comprising:
   in response to adding a second set of disks to a redundant array of independent disks previously having only a first set of disks, and to a total number of disks in the first set of disks and the second set of disks taken together exceeding a predetermined threshold,
      determining respective types of individual disks in the first set of disks and of individual disks in the second set of disks, where disks having the same type have the same physical capacity,
      determining a total number of disks in the first set of disks, and
      determining a total number of disks in the second set of disks;
   determining, based on the respective types of the individual disks in the first and second sets of disks, the total number of disks in the first set of disks and the total number of disks in the second set of disks, and a performance indicator of the redundant array of independent disks, respective types of individual disks and respective total numbers of disks to be contained in each of a plurality of sets to which the disks in the redundant array of independent disks are to be allocated after addition of the second set of disks to the redundant array of independent disks; and
   performing, based on the respective types of the individual disks in the first set of disks and the respective total number of disks in the first set of disks and to the respective types of individual disks and respective total numbers of disks to be contained in each of the plurality of sets to which the disks in the redundant array of independent disks are to be allocated after addition of the second set of disks to the redundant array of independent disks, allocation of at least one disk in the first set of disks to one of the plurality of sets to which the disks in the redundant array of independent disks are to be allocated after addition of the second set of disks to the redundant array of independent disks.

2. The method of claim 1, wherein the performance indicator of the redundant array of independent disks comprises at least one of the following: a configuration of the redundant array of independent disks, effective capacities of the respective disks in the first and second sets of disks, and the maximum effective capacity among the respective disks in the first and second sets of disks.

3. The method of claim 1, wherein determining the respective types of individual disks and respective total numbers of disks to be contained in each of the plurality of sets to which the disks in the redundant array of independent disks are to be allocated comprises:
   determining the respective types of individual disks and respective total numbers of disks to be contained in each of the plurality of sets to which the disks in the redundant array of independent disks are to be allocated so as to maximize a sum of effective capacities of the disks in the redundant array of independent disks after addition of the second set of disks at least in part by performing permutations for respective divisions of the disks in the redundant array of independent disks after addition of the second set of disks to the redundant array of independent disks.

4. The method of claim 1, wherein performing the allocation of the disk in the first set of disks comprises:
   performing the allocation of the disk in the first set of disks so as to minimize movement of data on the disks in the first set of disks at least in part by allocating the disk in the first set of disks to one of the plurality of sets that is most similar to the first set of disks of all the sets of disks in the plurality of sets of disks.

5. The method of claim 4, wherein performing the allocation of the disk in the first set of disks comprises:
   determining, from the plurality of sets, the one of the plurality of sets that is most similar to the first set of disks of all the sets of disks in the plurality of sets of disks by determining one of the plurality of sets having a maximum similarity to the first set of disks in terms of types of individual disks and total number of disks.

6. The method of claim 5, further comprising:
   wherein performing the allocation of the disk in the first set of disks further comprises updating, upon the allocation, the first set of disks and the one of the plurality of sets that is most similar to the first set of disks in the plurality of sets to reflect the allocation; and allocating, based on the updated first set of disks and updated plurality of sets, at least one other disk in the first set of disks to at least one set in the plurality of sets until all individual disks in the first set of disks have been allocated to individual ones of the plurality of sets.

7. The method of claim 5, wherein determining the one of the plurality of sets that is most similar to the first set of disks of all the sets of disks in the plurality of sets of disks further comprises:
generating, based on the respective types of individual disks in the first set of disks, a first matrix indicating total numbers of disks in the first set of disks corresponding to each individual type of disk present in the first and second sets of disks;
generating, based on the respective types of individual disks in each one of the sets in the plurality of sets of disks, a second matrix indicating a total number of disks, within each one of the sets in the plurality of sets, corresponding to each individual type of disk present in the first and second sets of disks;
obtaining a third matrix from a product of a transposed matrix of the first matrix and the second matrix, the third matrix storing a respective priority for each of the sets of disks in the plurality of sets of disks; and
determining a set in the plurality of sets corresponding to a maximum priority in the third matrix, as the one of the plurality of sets that is most similar to the first set of disks of all the sets of disks in the plurality of sets of disks.

8. The method of claim 1, further comprising:
performing, upon completion of allocation of all disks in the first set of disks, allocation of disks in the second set of disks to the plurality of sets.

9. An electronic device, comprising:
at least one processor; and
a memory coupled to the at least one processor and having instructions stored thereon, the instructions, when executed by the at least one processor, causing the device to execute acts comprising:
in response to adding a second set of disks to a redundant array of independent disks previously having only a first set of disks, and to a total number of disks in the first set of disks and the second set of disks taken together exceeding a predetermined threshold,
determining respective types of individual disks in the first set of disks and of individual disks in the second set of disks, where disks having the same type have the same physical capacity,
determining a total number of disks in the first set of disks, and
determining a total number of disks in the second set of disks;
determining, based on the respective types of the individual disks in the first and second sets of disks, the total number of disks in the first set of disks and the total number of disks in the second set of disks, and a performance indicator of the redundant array of independent disks, respective types of individual disks and respective total numbers of disks comprised in a plurality of sets to which the disks in the redundant array of independent disks are to be allocated after addition of the second set of disks to the redundant array of independent disks; and
performing, based on the respective types of the individual disks in the first set of disks and the respective total number of disks in the first set of disks and to the respective types of individual disks and respective total numbers of disks to be contained in each of the plurality of sets to which the disks in the redundant array of independent disks are to be allocated after addition of the second set of disks to the redundant array of independent disks, allocation of at least one disk in the first set of disks to one of the plurality of sets to which the disks in the redundant array of independent disks are to be allocated after addition of the second set of disks to the redundant array of independent disks.

10. The device of claim 9, wherein the performance indicator of the redundant array of independent disks comprises at least one of the following: a configuration of the redundant array of independent disks, effective capacities of the respective disks in the first and second sets of disks, and the maximum effective capacity among the respective disks in the first and second sets of disks.

11. The device of claim 9, wherein determining the respective types of individual disks and respective total numbers of disks to be contained in each of the plurality of sets to which the disks in the redundant array of independent disks are to be allocated comprises:
determining the respective types of individual disks and respective total numbers of disks to be contained in each of the plurality of sets to which the disks in the redundant array of independent disks are to be allocated so as to maximize a sum of effective capacities of the disks in the redundant array of independent disks after addition of the second set of disks at least in part by performing permutations for respective divisions of the disks in the redundant array of independent disks after addition of the second set of disks to the redundant array of independent disks.

12. The device of claim 9, wherein performing the allocation of the disk in the first set of disks comprises:
performing the allocation of the disk in the first set of disks so as to minimize movement of data on the disks in the first set of disks at least in part by allocating the disk in the first set of disks to one of the plurality of sets that is most similar to the first set of disks of all the sets of disks in the plurality of sets of disks.

13. The device of claim 12, wherein performing the allocation of the disk in the first set of disks comprises:
determining, from the plurality of sets, the one of the plurality of sets that is most similar to the first set of disks of all the sets of disks in the plurality of sets of disks by determining one of the plurality of sets having a maximum similarity to the first set of disks in terms of types of individual disks and total number of disks.

14. The device of claim 13, further comprising:
wherein performing the allocation of the disk in the first set of disks further comprises updating, upon the allocation, the first set of disks and the one of the plurality of sets that is most similar to the first set of disks in the plurality of sets to reflect the allocation; and
allocating, based on the updated first set of disks and updated plurality of sets, at least one other disk in the first set of disks to at least one set in the plurality of sets until all individual disks in the first set of disks have been allocated to individual ones of the plurality of sets.

15. The device of claim 13, wherein determining the one of the plurality of sets that is most similar to the first set of disks of all the sets of disks in the plurality of sets of disks further comprises:
generating, based on the respective types of individual disks in the first set of disks, a first matrix indicating total numbers of disks in the first set of disks corresponding to each individual type of disk present in the first and second sets of disks;

generating, based on the respective types of individual disks in each one of the sets in the plurality of sets of disks, a second matrix indicating a total number of disks, within each one of the sets in the plurality of sets, corresponding to each individual type of disk present in the first and second sets of disks;

obtaining a third matrix from a product of a transposed matrix of the first matrix and the second matrix, the third matrix storing a respective priority for each of the sets of disks in the plurality of sets of disks; and determining a set in the plurality of sets corresponding to a maximum priority in the third matrix, as the one of the plurality of sets that is most similar to the first set of disks of all the sets of disks in the plurality of sets of disks.

16. The device of claim 9, wherein the acts further comprise:

performing, upon completion of allocation of all disks in the first set of disks, allocation of disks in the second set of disks to the plurality of sets.

17. A computer program product having a non-transitory computer readable medium which stores a set of instructions to perform storage management; the set of instructions, when carried out by computerized circuitry, causing the computerized circuitry to perform a method of:

in response to adding a second set of disks to a redundant array of independent disks previously having only a first set of disks, and to a total number of disks in the first set of disks and the second set of disks taken together exceeding a predetermined threshold, determining respective types of individual disks in the first set of disks and of individual disks in the second set of disks, where disks having the same type have the same physical capacity, determining a total number of disks in the first set of disks, and determining a total number of disks in the second set of disks;

determining, based on the respective types of the individual disks in the first and second sets of disks, the total number of disks in the first set of disks and the total number of disks in the second set of disks, and a performance indicator of the redundant array of independent disks, respective types of individual disks and respective total numbers of disks to be contained in each of a plurality of sets to which the disks in the redundant array of independent disks are to be allocated after addition of the second set of disks to the redundant array of independent disks; and performing, based on the respective types of the individual disks in the first set of disks and the respective total of disks in the first set of disks and to the respective types of individual disks and respective total numbers of disks to be contained in each of the plurality of sets to which the disks in the redundant array of independent disks are to be allocated after addition of the second set of disks to the redundant array of independent disks, allocation of at least one disk in the first set of disks to one of the plurality of sets to which the disks in the redundant array of independent disks are to be allocated after addition of the second set of disks to the redundant array of independent disks.

* * * * *